United States Patent Office 3,401,531
Patented Sept. 17, 1968

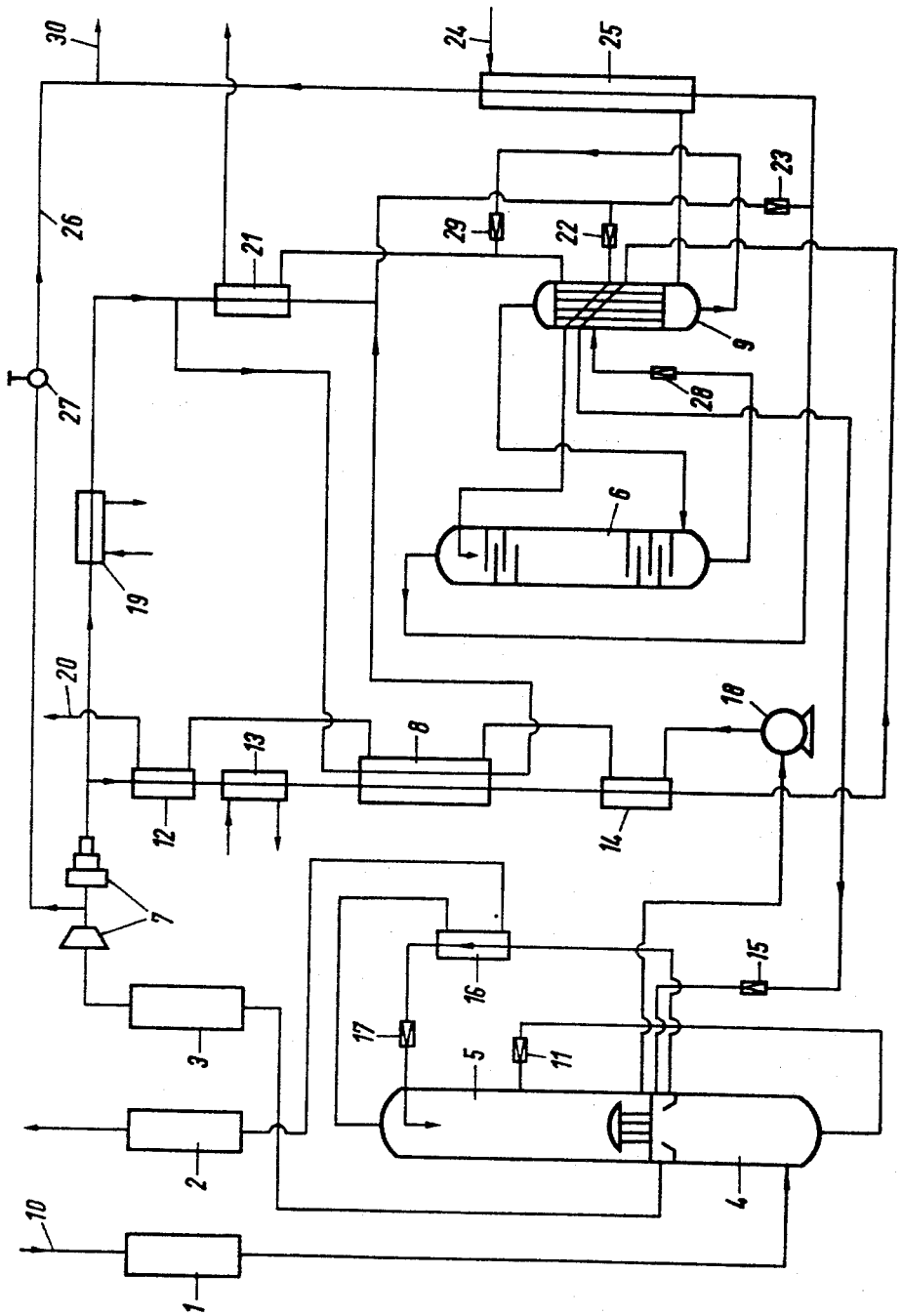

3,401,531
HEAT EXCHANGE OF COMPRESSED NITROGEN AND LIQUID OXYGEN IN AMMONIA SYNTHESIS FEED GAS PRODUCTION
Godehard Kessler, Strasslach, near Munich, and Walter Scholz, Munich-Solln, Germany, assignors to Linde Aktiengesellschaft, Wiesbaden, Germany
Filed May 17, 1966, Ser. No. 550,689
Claims priority, application Germany, May 19, 1965,
G 43,643
9 Claims. (Cl. 62—20)

This invention relates to a process which beneficially interrelates the separation of air with the separation of hydrogen-containing gas mixtures, particularly converter gas, wherein nitrogen withdrawn from an air rectification column and compressed to a high pressure in the gaseous state at ambient temperature, is then cooled and employed for washing out the difficultly condensible components of the gas mixture.

It is old to produce hydrogen, or hydrogen-nitrogen mixtures, from hydrogen-containing gas mixtures, particularly from converter gas. In this connection, most of the non-hydrogen components of the gas mixture are condensed, one after the other, and the remainder—components which are difficult to condense, such as carbon monoxide and methane—are scrubbed out by liquid nitrogen. The liquid nitrogen is obtained by cooling and expanding compressed, ambient temperature nitrogen.

It is likewise old, in air separation processes, to produce oxygen under pressure. In this process, liquid oxygen is (a) withdrawn from the reboiler of a low pressure column, (b) pumped to an elevated pressure, (c) vaporized in heat exchange relationship with high pressure nitrogen or with air compressed to a high pressure, and (d) then warmed to the ambient temperature. In this case, a high pressure nitrogen cycle is employed, i.e., nitrogen is (a) withdrawn from the rectification column, (b) warmed to ambient temperature, (c) compressed to a high pressure, (d) again cooled in heat exchange with vaporizing high pressure oxygen, and (e) expanded into the rectification column.

It is also known to integrate an air separation process for obtaining pure, gaseous, but almost atmospheric pressure oxygen, with a process for the separation of hydrogen-containing gas mixtures (German Patent No. 1,023,051). In this known method, the nitrogen used in the scrubbing process is (a) withdrawn directly from an air separation plant, (b) compressed in the gaseous form to a high pressure, (c) cooled in a countercurrent relationship with itself and with components of the H₂ gas mixture, and (d) at least partially liquified in indirect heat exchange with air to be separated. The refrigeration necessary for the washing step is thus partially taken from the air separation plant. By this known method, oxygen and a hydrogen-nitrogen mixture can be produced simultaneously in a single plant; however, the oxygen can be withdrawn from this plant only at ambient pressure.

An object of this invention therefore is to provide an integrated process and apparatus for the separation of air with the separation of hydrogen-containing gas mixtures, particularly of converter gas, wherein nitrogen withdrawn in a manner known per se, from the air rectification column, compressed to a high pressure at ambient temperature and in the gaseous state, is cooled and is employed for washing out the difficultly condensible components of the gas mixture, said process also being capable of providing oxygen under pressure.

Another object is to provide such an integrated process which operates in a thermodynamically and economically advantageous manner.

Upon further study of the specification and appended claims, other objects and advantages of this invention will become apparent.

These objectives are attained by bringing at least a portion of the high pressure nitrogen to be used for the scrubbing step, after being cooled from ambient temperature, into heat exchange with vaporizing high pressure oxygen; and by cooling a stream of high pressure nitrogen to be used as reflux in the rectification column, by heat exchange with high pressure oxygen, and afterwards by heat exchange with nitrogen and components of the gas mixture.

The combination of a process for obtaining high pressure oxygen by air separation with a process for gas separation according to the invention results in a substantial decrease in the energy requirements for conducting both processes. Consequently, the high pressure oxygen as well as the hydrogen-nitrogen mixture can be produced less expensively, as compared to carrying out the separation processes separately. Since the two processes, according to the invention, are thermally interrelated in two places, wherein, on the one hand, heat is supplied to the air separation process and is withdrawn from the gas mixture separation process, and, on the other hand, heat is supplied to the gas mixture separation process and withdrawn from the air separation process, it is possible to balance the refrigeration equilibrium of both processes, each taken by itself. This technique has a thermodynamically favorable effect.

The considerably more economical operation of the process of the invention, as compared to a separate operation of both separation processes, stems predominantly from the fact that the two thermal coupling steps are carried out at two different, definite temperature levels. The temperature levels, according to the invention, are selected in such a manner that there is always coupled a thermodynamically "weak point" of one system with a thermodynamically "strong point" of the other system, i.e., where in one process heat is missing for conducting a process step in a thermodynamically favorable manner, this heat is supplied to this step from the other process where heat is amply available at a higher temperature level. Thus, for example, in the air separation process, there can be employed additional heat effectively, in addition to the heat supplied by the high pressure nitrogen, for vaporizing the pressure oxygen. However, in the hydrogen gas mixture, separation process, the pre-cooled high pressure nitrogen is available at a higher temperature level, which nitrogen is to be further cooled. Therefore, according to this invention, pre-cooled high pressure nitrogen to be used for the scrubbing step is brought into heat exchange with the vaporizing high pressure oxygen, whereby the particular process step of each individual process—on the one hand vaporization of the high pressure oxygen, and on the other hand cooling of the pre-cooled high pressure nitrogen—can be rendered thermodynamically more efficient.

According to one embodiment of the inventive idea, the nitrogen serving for the scrubbing step and the nitrogen to be expanded into the rectification column are compressed together to a high pressure. Thus, the circulating compressor, constructed for dry operation, which is conventionally employed for use in known processes for obtaining high pressure oxygen, is advantageously employed at the same time for the necessary compression of the scrubbing nitrogen to a high pressure, and in this way aids in satisfying the refrigeration requirements of the gas separation plant.

According to a further aspect of this invention, the high pressure nitrogen to be used in the scrubbing step is cooled from ambient temperature by an external cooling source. Since an external cooling source, for example an ammonia pre-cooling process, is relatively inexpensive in this temperature range which is close to the ambient temperature, it is advantageous to use same at this point in the process for refrigeration input.

Following the external cooling step, a portion of the nitrogen to be used in the scrubbing step is then brought into heat exchange with vaporizing high pressure oxygen. The remainder of the nitrogen can likewise be further cooled in heat exchange with nitrogen and with components of the gas mixture.

The thus-cooled high pressure nitrogen can then be expanded, in total, to about the pressure of the scrubbing column and be brought into heat exchange with nitrogen and components of the gas mixture, and passed in the liquid phase to the head of the scrubbing column.

The high pressure oxygen which, according to this invention, is to brought into heat exchange with high pressure nitrogen to be used for the scrubbing step can be produced, according to one embodiment of this invention, by the pumping of oxygen withdrawn in the liquid phase from the rectification column, and can be vaporized not only in heat exchange with high pressure nitrogen serving for scrubbing purposes, but also with high pressure nitrogen to be eventually recycled into the rectification column, the heat exchange being preferably conducted in the same heat exchanger. Then, the high pressure oxygen can be further warmed to the ambient temperature in heat exchange with only the high pressure recycle nitrogen.

The high pressure recycle nitrogen can be further cooled, according to a preferred embodiment of this invention, after a first cooling by high pressure oxygen, by means of an inexpensive external cooling before it is again passed in heat exchange relation with high pressure oxygen and cooled, according to this invention, by nitrogen and components of the gas mixture and is then expanded via a throttle valve into the rectification column.

The attached drawing is a schematic flowsheet of a preferred embodiment of this invention, but is not to be considered as limiting the appended claims in the light of the description of the invention, taken as a whole.

In the drawing, there is shown an apparatus for the production of a hydrogen-nitrogen mixture for ammonia synthesis and for producing high pressure oxygen which can be utilized for a variety of purposes. (All pressures mentioned hereinafter are absolute.)

The entire apparatus comprises the air separation system with the regenerators 1, 2, and 3, a double column with high pressure column 4 and the low pressure column 5, and a number of heat exchangers, and the gas separation system with the scrubbing column 6 and also a plurality of heat exchangers. The compressors 7 are used for compressing nitrogen to be recycled and expanded into the rectification column, as well as nitrogen to be used for the scrubbing step, to a high pressure of about 60 to 200 atmospheres. Consequently, both separation plants can make do with only a single turbo-compressor which is constructed for dry operation. The coupling of the two separating systems is accomplished in the heat exchangers 8 and 9.

The air separating plant is supplied with air compressed to somewhat above the pressure of the high pressure column 4, via the conduit 10. The air cooled and cleansed in the regenerator 1 is then directly fed to the high pressure column 4 operating at about 5 to 6 atmospheres. At the bottom of the high pressure column 4, an oxygen-rich sump liquid is withdrawn and expanded, via a throttle valve 11, into the low pressure column 5, operating at about 1.3 to 1.7 atmospheres.

Gaseous nitrogen is withdrawn from the condenser of the high pressure column 4, is warmed in the regenerator 3 to ambient temperature, and compressed in the compressor 7, in several stages, to a high pressure. A part, about 20 to 80%, of the nitrogen compressed to a high pressure is then recycled to the rectification column; the other part is conducted into the gas mixture separating system and here serves as scrubbing liquid to remove the components of the convertor gas which are difficult to condense.

The high pressure nitrogen to be recycled to the rectification column is cooled by high pressure oxygen in the heat exchanger 12, by an inexpensive external ammonia cycle in the heat exchanger 13, and by vaporizing high pressure oxygen in the heat exchangers 8 and 14. For further cooling, the high pressure nitrogen is then passed into the gas separation plant and is there brought into heat exchange with nitrogen and components of the convertor gas. There is thus supplied heat from the air separation plant to the gas separation plant. The thus-cooled high pressure nitrogen is subsequently expanded via the throttle valve 15 into the high pressure column 4, and enters same essentially in the liquid phase.

Distilled liquid nitrogen is withdrawn from the head of the high pressure column, is supercooled in the heat exchanger 16, and is expanded via the throttle valve 17 into the low pressure column 5. For supercooling this nitrogen, there is employed nitrogen withdrawn from the head of the low pressure column 5 in gaseous form, this latter nitrogen being employed subsequently as the cleaning gas in the regenerator 2, and thus absorbs in the regenerator 2 components congealed therein during the cooling of the air, such as $CO_2$ and $H_2O$.

Since only oxygen is to be produced under pressure, the pure oxygen withdrawn in the liquid state from the evaporator of the low pressure column 5 is brought, by means of the liquid pump 18, to a pressure somewhat above the desired final pressure of about 20 to 50 atmospheres, and is subsequently vaporized in the heat exchangers 14 and 8. The heat requirements are supplied, on the one hand, by the high pressure nitrogen to be expanded into the rectification column, and, on the other hand, by the high pressure nitrogen conducted into the gas separation plant and cooled from the ambient temperature by external cooling in the heat exchanger 19 to about 240 to 210° K.

Here, then, the second thermal coupling of the two processes is conducted:

Heat is supplied to the air separation plant and withdrawn from the gas separation plant. Thus, the second coupling is exactly the reverse of the first coupling, whereby the refrigeration equilibrium of the two processes is again balanced. The second coupling step is selected to be particularly advantageous thermodynamically, because, on the one side, much heat is needed for vaporizing the high pressure oxygen and, on the other side, the high pressure nitrogen can relinquish a large amount of heat, so that this coupling provides substantial advantages for both processes, having a particularly favorable effect upon the energy requirements.

Heating of the high pressure oxygen to the ambient temperature is then accomplished by high pressure nitrogen in heat exchanger 12. This ambient temperature high pressure oxygen can be withdrawn from the plant via conduit 20.

The portion of the high pressure nitrogen to be used for scrubbing is cooled, as mentioned above, by an ammonia cooling process in the heat exchanger 19, so that its temperature is lowered from the ambient temperature. This external cooling is inexpensive at the temperature levels involved.

The portion (about 80 to 20%) of the high pressure nitrogen to be used for scrubbing which is not passed through the heat exchanger 8 is cooled, in the heat exchanger 21, by nitrogen and residual components of the converter gas, and is then combined with the portion passed through the heat exchanger 8. Thereafter, the high pressure nitrogen is, in part, expanded in the throttle valve 22 to about the pressure of the scrubbing column 6, i.e. about 5 to 50 atmospheres, cooled in heat exchanger 9, and fed in liquid form to the head of the scrubbing column 6.

The other portion of the high pressure nitrogen can be expanded, via the throttle valve 23, into the pure hydrogen-nitrogen mixture removed from the head of the scrubbing column 6.

In the washing column 6, the converter gas fed to the gas separation plant via conduit 24 and cooled and pre-purified in the heat exchangers 25 and 9 flows in countercurrent relation to the liquid nitrogen. During this step, the remainder of the undesired components which are difficult to condense, predominantly CO, Ar and $CH_4$, are scrubbed out of the converter gas, so that a pure hydrogen-nitrogen mixture can be withdrawn from the head of the scrubbing column 6. To this mixture there can be added, for attaining the composition necessary for the ammonia synthesis, nitrogen compressed to an intermediate pressure, this nitrogen being supplied at ambient temperature through conduit 26. The respective amount of nitrogen to be admixed can be adjusted by a control valve 27.

The liquid collecting in the bottom of the scrubbing column is expanded into the heat exchanger 9 via the throttle valve 28. The vapor formed in heat exchanger 9 is combined with the liquid from the bottom of the heat exchanger 9 which is expanded and vaporized in the throttle valve 28. This combined fluid consisting primarily of $CH_4$ and CO is warmed in heat exchanger 21, and is then removed from the system and can be used for its heating value.

Pure hydrogen-nitrogen mixture is withdrawn from the plant via conduit 30 and can then be supplied to an ammonia synthesis plant.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An integrated process for the low temperature separation of air into nitrogen and high pressure oxygen and the separation of a hydrogen-containing gaseous mixture into enriched hydrogen, the steps of:
   (a) withdrawing nitrogen from an air rectification column and compressing at least a portion of said nitrogen to a high pressure;
   (b) withdrawing liquid oxygen from said air rectification column and compressing same in the liquid phase to a high pressure;
   (c) passing at least a portion of resultant high pressure gaseous nitrogen into heat exchange relationship with resultant high pressure liquid oxygen and vaporizing said liquid oxygen while cooling said gaseous nitrogen;
   (d) liquefying resultant cooled gaseous nitrogen; and
   (e) passing resultant liquid nitrogen into the top of a scrubbing column in direct countercurrent contact with ascending hydrogen-containing gaseous mixture.

2. A process as defined by claim 1, further comprising:
   (f) compressing another portion of the nitrogen from the air rectification column to a high pressure;
   (g) passing said another portion of compressed nitrogen in indirect heat transfer relationship to resultant vaporized high pressure oxygen to cool said another portion;
   (h) reducing the pressure of resultant cooled another portion; and
   (i) recycling resultant pressure-reduced another portion to said air rectification column.

3. A process as defined by claim 2, further comprising the intermediate steps (g) and (h) of further cooling resultant cooled another portion by passing the latter in indirect heat exchange relationship to said liquefied nitrogen from step (d) and also residual fluid withdrawn from the bottom of said scrubbing column.

4. A process as defined by claim 2, characterized in that the nitrogen to be used for the scrubbing step and the nitrogen to be recycled into the rectification column are compressed together to a high pressure.

5. A process as defined by claim 2, characterized in that oxygen obtained by the air separation process is vaporized in simultaneous heat exchange with both the high pressure nitrogen to be recycled to the rectification column and with the nitrogen to be used for scrubbing.

6. A process as defined by claim 5, wherein the vaporized oxygen is further heated to ambient temperature by individual heat exchange with said recycle high pressure nitrogen.

7. A process as defined by claim 1, characterized in that the high pressure nitrogen to be used for the scrubbing step is cooled down from ambient temperature by external cooling.

8. A process as defined by claim 1, characterized in that, after the external cooling step, a second portion of high pressure nitrogen to be used for the scrubbing step, which is not brought into heat exchange with vaporizing pressure oxygen, is further cooled in heat exchange with residual components withdrawn from the bottom of the scrubbing column.

9. A process as defined by claim 1, characterized in that the entire high pressure nitrogen to be used in the scrubbing step, after (1) external cooling, (2) high pressure oxygen cooling, and (3) cooling by residual fluid from scrubbing column, is expanded to a low pressure before liquefaction thereof.

References Cited

UNITED STATES PATENTS

| 1,913,805 | 6/1933 | Hausen | 62—23 X |
| 2,962,867 | 12/1960 | Seidel | 62—13 X |
| 3,209,548 | 10/1965 | Grunberg et al. | 62—13 X |
| 3,216,206 | 11/1965 | Kessler | 62—13 |
| 3,257,814 | 6/1966 | Carbonell | 62—13 X |
| 3,312,075 | 4/1967 | Becker | 62—23 X |

FOREIGN PATENTS

| 1,003,728 | 9/1965 | Great Britain. |
| 1,013,422 | 12/1965 | Great Britain. |

NORMAN YUDKOFF, *Primary Examiner.*

W. PRETKA, *Assistant Examiner.*